April 11, 1944.　　M. B. MENTLEY　　2,346,266

GEAR CROWNING

Filed April 21, 1941　　2 Sheets-Sheet 1

INVENTOR.
MAX B. MENTLEY
BY Whittemore, Hulbert
& Belknap ATTORNEYS

April 11, 1944.                M. B. MENTLEY                 2,346,266
                                GEAR CROWNING
              Filed April 21, 1941                  2 Sheets-Sheet 2

INVENTOR
MAX B. MENTLEY
BY Whittemore, Hulbert
   & Belknap  ATTORNEYS

Patented Apr. 11, 1944

2,346,266

UNITED STATES PATENT OFFICE 2,346,266

GEAR CROWNING

Max B. Mentley, Detroit, Mich., assignor to National Broach & Machine Company, Detroit, Mich., a corporation of Michigan Application April 21, 1941, Serial No. 389,655

13 Claims. (Cl. 90—1.6)

The present invention relates to a method of crowning gears and more particularly to a method in which the gear to be finished is run in mesh with a gearlike finishing tool. A relative motion between the gear and tool is imposed which is equivalent to causing the gear to wabble about an axis in a controlled manner. This wabble motion referred to is equivalent to the motion which would be imparted to a gear if it were mounted on a spindle and then the gear and the spindle were rotated about an axis with the spindle extending at a slight angle to the axis.

It will be appreciated that this wabble motion may be considered as composed of two independent motions, one of which is an oscillation of the gear about a first axis perpendicular to its own axis and the other of which is a similar oscillation of the gear about a second axis perpendicular to its own axis and perpendicular also to the said first axis.

The oscillation between the gear and tool about the first and second axes referred to results in relative slippage longitudinally between the teeth of the gear and tool and in addition results in a relative motion which is more effective adjacent the ends of the gear teeth than adjacent the center thereof.

With the foregoing general remarks in mind, it is an object of the present invention to crown gear teeth by meshing a gear to be crowned with a gearlike tool, rotating the gear and tool in mesh, and imposing a relative wabble motion between the gear and tool.

Other objects of the invention will be apparent as the description proceeds, and when taken in conjunction with the accompanying drawings, wherein.

Figure 1:
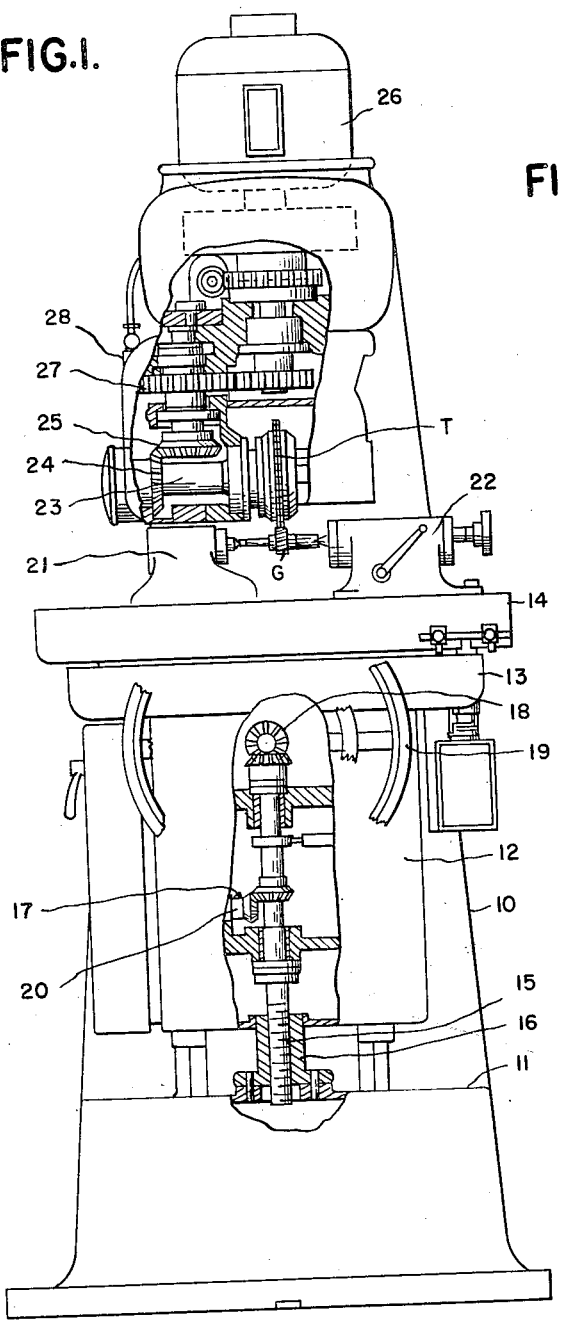
Figure 1 is a front elevation of a machine adapted to perform the present method, with parts broken away and parts in section.

Referring first to Figure 1 I have indicated a gear finishing machine as comprising a base 10 having a forwardly projecting knee 11 and a vertical slide 12 terminating in a table 13. Mounted on the table 13 is a carriage 14 which has suitable means associated therewith for reciprocating the table in a horizontal plane to the right and left as seen in Figure 1.

Means are provided for feeding the slide 12 vertically and include a feed screw 15, a nut 16 and means indicated generally at 17 for rotating the feed screw. Other means indicated generally at 18 including a handwheel 19 are provided for rotating the feed screw 15.

The machine illustrated is adapted to perform various gear finishing operations, and in one method of finishing the gears the slide 12 is moved vertically upward at the end of a stroke of the carriage 14. According to the present invention, however, it is preferred to feed the slide 12 vertically upward in a gradual, continuous manner and for this purpose suitable driving means (not shown) may be connected to the bevel gear 20 for continuously rotating the same at a very slow rate.

Mounted on the carriage 14 is a tailstock 21 and a headstock 22, between which the gear G to be finished is mounted for free rotation.

Carried by the frame 10 and overhanging the carriage 14 is the tool supporting mechanism which includes a tool spindle 23 having a bevel gear 24 thereon meshed with a cooperating bevel gear 25 which is rotated from a motor 26 through the medium of gearing 27.

The frame portion 28 which mounts the tool spindle 23 is mounted for adjustment about a vertical axis so as to vary the crossed axes setting between the gear G and a tool T mounted on the tool spindle 23.

In finishing gears according to the present invention the driving mechanism which reciprocates the carriage 14 to the right and left as seen in Figure 1, is connected so that the gear G is continuously fed vertically with the axial reciprocation.

The gear finishing tool T may be of the type disclosed in Drummond Patent 2,126,178, and is not illustrated herein. For completeness however, it will be noted that this type of tool has teeth which are conjugate to the gear being finished. The teeth of the tool are provided with grooves extending up and down their faces, which grooves provide intermediate ribs having cutting edges at the intersection of the side surfaces with faces of the teeth. Alternatively the tool may be a lap, or a hardened burnishing tool, either with or without relieving grooves.

In order to finish the teeth of the gear G in accordance with the present invention, there are three relative motions between the tool T and the gear G. The first of these is a meshed rotation of the two in which one part is positively driven and thereby drives the other. The machine illustrated in Figure 1 is adapted to rotate the tool T directly and the gear G is driven thereby. In addition to the meshed rotation there is a gradual feed between the gear and tool in a direction radial to both. This is equivalent to a reduction of center distance between the two.

The finishing action and the crowning action is the result of the third of the relative motions referred to. This relative motion is a motion which results from the wabble motion of the tool about an axis.

In Figures 2 to 5 I have illustrated a succession of attitudes assumed by the gear and tool during this method of gear finishing. In these figures the angular motions are clearly exaggerated in order to emphasize the character of the movements.

Figure 2:
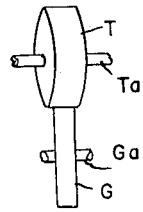
Figures 2 to 5 are diagrams indicating successive relative attitudes of a gear and tool during a cycle of the present method.
Figure 4:
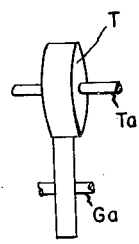
Figure 5:
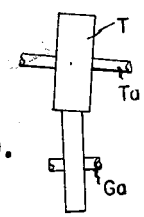

In Figure 2 I have shown the gear G as meshed with the tool T, and at this instant the tool has its axis $T_a$ horizontal but inclined to the axis $G_a$ of the gear by a slight amount. The axis $G_a$ of the gear G in this figure, and in Figures 3, 4 and 5, is shown as horizontal and as occupying the plane of the paper.

Figure 3:
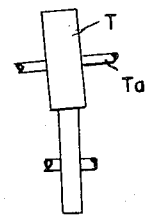

In Figure 3 the tool T has moved to a position in which its axis $T_a$ is inclined from the horizontal and occupies the plane of the paper. In Figure 4 the tool T is moved to a new position in which its axis $T_a$ is again horizontal but is inclined relative to the axis $G_a$ of the gear in an opposite direction from its inclination thereto, as shown in Figure 2. In Figure 5 the tool T is moved to a new position in which its axis $T_a$ again occupies the plane of the paper, but is now inclined to the axis $G_a$ of the gear in an opposite direction from the inclination shown in Figure 3.

It will be understood that the sequence of relative motions described in connection with Figures 2 to 5 is such as would result from a motion of the tool in which points along its axis remote from the tool move in a circular path in timed relation and 180° out of phase, whereby the axis $T_a$ swivels or wabbles about a fixed point located between the end faces of the gear.

Figure 6:
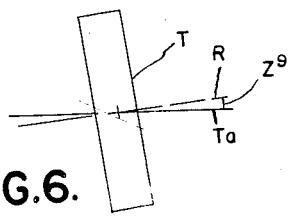
Figure 6 is a diagrammatic view illustrating one method of carrying out the present invention.

In Figure 6 I have indicated a simple way of effecting the motion of the tool referred to. In this figure the tool T is disclosed as having an axis $T_a$. In order to effect the wabble motion referred to the tool T is rotated about an axis R with the axis of the tool inclined from the axis H by a small angle indicated by the numeral $Z^9$. It will be apparent that by this means the tool if meshed with the gear will assume the relative attitudes shown in Figures 2 to 5, inclusive, and the axis of the tool will move through conical paths.

It may be stated at this time that the angle $Z^9$ employed will of course be very small, on the order of thirty minutes or preferably not more than fifty-five minutes.

Figure 7:
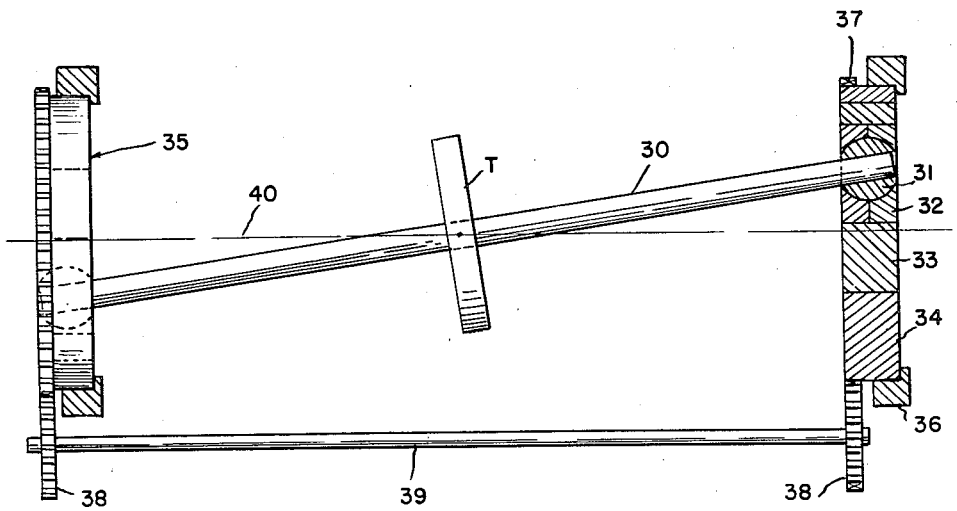
Figure 7 is a more or less diagrammatic side elevation, partly in section, of apparatus for carrying out the present invention in a somewhat different manner.
Figure 8:
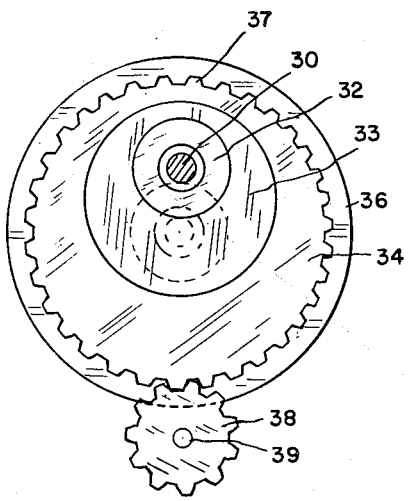
Figure 8 is an end elevation of the structure shown in Figure 7.

In Figures 7 and 8 I have indicated mechanism for accomplishing a similar result, which has the added advantage of permitting adjustment of the angle of wabble. In this mechanism the tool T is indicated as mounted coaxially with the spindle 30. Opposite ends of the spindle 30 are received in spherical bearings 31 which are mounted in spherically shaped recesses in a cylindrical body 32 mounted eccentrically in a second cylindrical body 33. The cylindrical body 33 is mounted eccentrically in a third body 34, the arrangement being such that by rotation of the body 33 in the body 34, the eccentricity of the body 31 relative to the body 34 may be adjusted from any amount between that illustrated in full lines in Figure 8, for example, and zero as indicated by dotted lines. The structure indicated generally at 35 at the opposite end of the spindle 30 is identical with that shown at the right-hand end of the spindle 30. The bodies 34 are mounted for rotation in suitable bearings indicated generally at 36 and are provided with means for driving the same in accurately timed relation, such for example as gear teeth 37 formed thereon. Driving means are illustrated as a pair of gears 38 mounted on a shaft 39, rotated by any suitable means. The gears 38 are of the same size and will rotate the cylindrical members at the same speed, which will result in the desired wabble motion if the ends of the spindle 30 are properly set to move at all times in opposite directions. It will be observed that the method resulting from this operation is the same as that previously described.

The apparatus illustrated in Figures 7 and 8 permits adjustment of the device to vary the angle of wabble or the angle between the axis of the gear and the axis of rotation thereof.

Other obvious means may be employed for modifying this motion, such for example as means for causing the opposite ends of the tool spindle to move in closed circular paths. Such means will be obvious to those skilled in the art, and merely by way of suggestion it is mentioned that such a motion could be obtained by pairs of slotted plates at opposite ends of the spindle, with the slots in each pair of plates arranged at 90° to each other, in combination with cams for effecting simultaneous horizontal and vertical movement of the ends of the spindle in timed relation, such as to produce movement of the spindle in closed paths, either circular or otherwise.

The component of the wabble motion which results from movement of the ends of the tool spindle vertically (with the parts disposed in the relation illustrated throughout) results in a relative sliding motion between the surfaces of the teeth of the tool and teeth of the gear. This sliding motion, where the cutting edges previously referred to are present, will result in removal of chips of material from the teeth of the gear.

As previously indicated it is desirable to provide a gradual relative feed between the gear and tool, which may conveniently be provided in the machine illustrated in Figure 1 by feeding the slide 12 vertically. It is further desirable, when the teeth of the gear have been machined to their desired contour, to arrest the feed and to continue the relative rotation and wabble motion between the parts for a period sufficient to provide a desirable finish to the surfaces of the teeth of the gear.

As will be obvious, the crowned effect obtained will depend largely upon the angle between the axis of the tool and the axis about which the tool is rotated. The result may further be varied by modifying the shape of the teeth of the tool as desired, for example by providing crowned or barrel-shaped teeth on the tool.

While I have illustrated the method and apparatus for carrying out the method for crowning gears in considerable detail, it will be appreciated that this has been done merely to enable those skilled in the art to practice the invention, the scope of which is indicated by the appended claims.

What I claim as my invention is:

1. A method of crowning gears which comprises meshing a gear member and gearlike tool member, rotating said gear member and tool member with one driving the other, and imparting a relative wabble motion to said gear member and tool member by continuously including part of the axis of one of said members in a conical path.

2. A method of crowning gears which comprises meshing a gear member and gearlike tool member, rotating said gear member and tool member with one driving the other, and imparting a relative wabble motion to said gear member and tool member by continuously including part of the axis of said tool member in a conical path.

3. A method of crowning gears which comprises meshing a gear member and gearlike tool member, rotating said gear member and tool member with one driving the other, and imparting a relative wabble motion to said gear member and tool member by rocking one of said members in conical points about a point in its gometric axis between the side faces of said member.

4. A method of crowning gears which comprises meshing a gear member and gearlike tool member, rotating said gear member and tool member with one driving the other, and imparting a relative wabble motion to said gear member and tool member by rocking said tool member in conical paths about a point in its geometric axis between the side faces of said member.

5. A method of crowning gears which comprises meshing a gear member and gearlike tool member, rotating said gear member and tool member with one driving the other, and imparting a relative wabble motion to said gear member and tool member by simultaneously rocking the axis of one of said members about axes perpendicular to each other and perpendicular to an axis intersecting the axis of said gear, said rocking motions bearing a predetermined timed relation to each other.

6. A method of crowning gears which comprises meshing a gear member and gearlike tool member, rotating said gear member and tool member with one driving the other, and imparting a relative wabble motion to said gear member and tool member by simultaneously rocking the axis of one of said members about axes perpendicular to each other and perpendicular to an axis intersecting the axis of said gear, said rocking motions bearing a predetermined timed relation to each other such that a point on the axis of said member moves in a closed, curved path.

7. A method of crowning gears which comprises meshing a gear member and gearlike tool member, rotating said gear member and tool member with one driving the other, and imparting a relative wabble motion to said gear member and tool member by simultaneously rocking the axis of one of said members about axes perpendicular to each other and perpendicular to an axis intersecting the axis of said gear, said rocking motions bearing a predetermined timed relation to each other such that a point on the axis of said member moves in a circular path.

8. A method of crowning gears which comprises meshing a gear member and gearlike tool member, rotating said gear member and tool member with one driving the other, and imparting a relative wabble motion to said gear member and tool member by rotating one of said members about an axis with the axis of the rotated member inclined to the first mentioned axis.

9. A method of crowning gears which comprises meshing a gear member and gearlike tool member, rotating said gear member and tool member with one driving the other, and imparting a relative wabble motion to said gear member and tool member by rotating said tool member about an axis with the axis of said tool member inclined to the first mentioned axis.

10. A method of crowning gears which comprises meshing a gear member and gearlike tool member, rotating said gear member and tool member with one driving the other, and imparting a relative wabble motion to said gear member and tool member by rotating one of said members about an axis with the axis of the rotated member inclined to and intersecting the axis of rotation at a point between the side faces of said member.

11. A method of crowning gears which comprises meshing a gear member and gearlike tool member, rotating said gear member and tool member with one driving the other, and imparting a relative wabble motion to said gear member and tool member by rotating said tool member about an axis with the axis of said tool member inclined to and intersecting the axis of rotation at a point between the side faces of said tool member.

12. The method of crowning a gear which comprises providing a gearlike tool having teeth conjugate to the teeth of the gear, mounting said tool for rotation about an axis with the axis of said tool inclined slightly to and intersecting the first mentioned axis at a point between the side faces of said tool, meshing a gear to be crowned with said tool, the median plane of said gear containing the intersection between the axes, and rotating said gear and tool in mesh with one driving the other.

13. The method of crowning a gear which comprises providing a gearlike tool having teeth conjugate to the teeth of the gear, mounting said tool for rotation about an axis with the axis of said tool inclined slightly to and intersecting the first mentioned axis at a point between the side faces of said tool, meshing a gear to be crowned with said tool, the median plane of said gear containing the intersection between the axes, rotating said gear and tool in mesh with one driving the other.

MAX B. MENTLEY.